United States Patent [19]

Westell

[11] Patent Number: 5,036,398
[45] Date of Patent: Jul. 30, 1991

[54] FILM WRITER AND VIEWER SYSTEM

[75] Inventor: William E. Westell, Weston, Mass.

[73] Assignee: Honeywell Regelsysteme GmbH, Fed. Rep. of Germany

[21] Appl. No.: 416,369

[22] Filed: Oct. 3, 1989

[51] Int. Cl.$^5$ .................. H04N 5/253; H04N 5/36
[52] U.S. Cl. ..................... 358/214; 358/54; 358/215; 355/20; 346/110 R
[58] Field of Search ............. 358/214, 54, 76, 215, 358/75, 109, 102, 447, 479, 487; 355/20, 27, 48; 346/33 A, 33 B, 110 R; 354/65-69, 71, 73

[56] References Cited

U.S. PATENT DOCUMENTS

| | | | |
|---|---|---|---|
| 3,919,474 | 11/1975 | Benson | 358/215 |
| 4,332,466 | 6/1982 | Flasck | 355/27 |
| 4,689,691 | 8/1987 | Isogai et al. | 358/280 |
| 4,772,952 | 9/1988 | Liem | 358/214 |
| 4,841,317 | 6/1989 | Westell | 358/214 |
| 4,935,749 | 6/1990 | Sakakibara et al. | 346/110 R |

Primary Examiner—James J. Groody
Assistant Examiner—Safet Metjahic
Attorney, Agent, or Firm—Kinney & Lange

[57] ABSTRACT

A film writer and viewer system operable to reduce the exposure requirements of the writer and thereby extend its life by providing a pre-exposure lamp to increase the density of the film to a first value and by providing an image enhancer on the output of a video camera viewing the film to increase the contrast between the information on the film and the background for subsequent viewing.

29 Claims, 2 Drawing Sheets

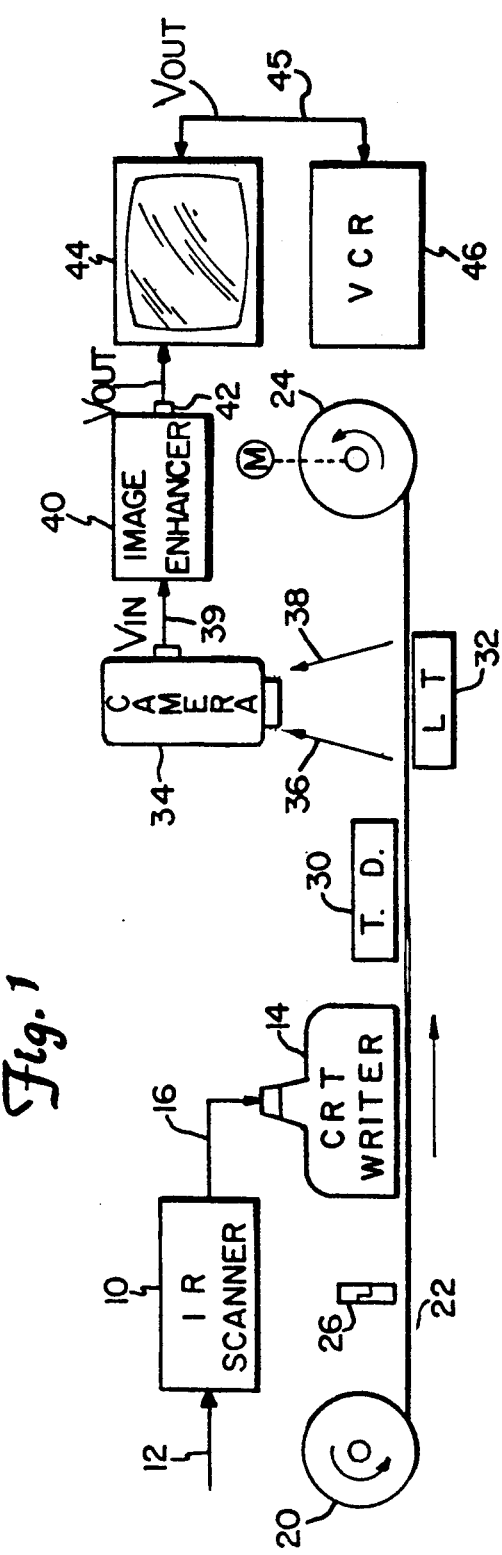
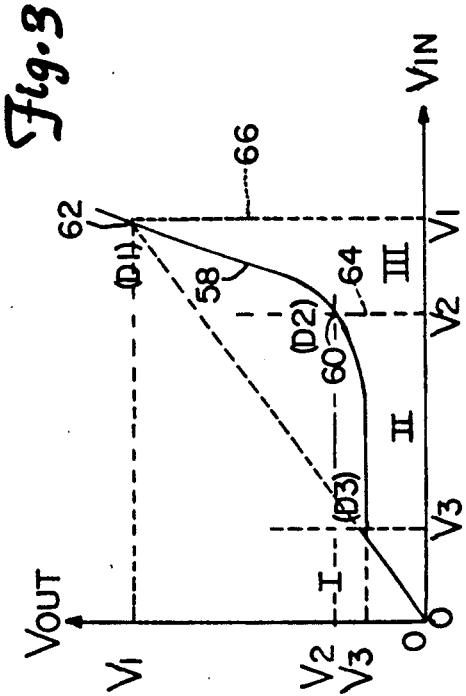
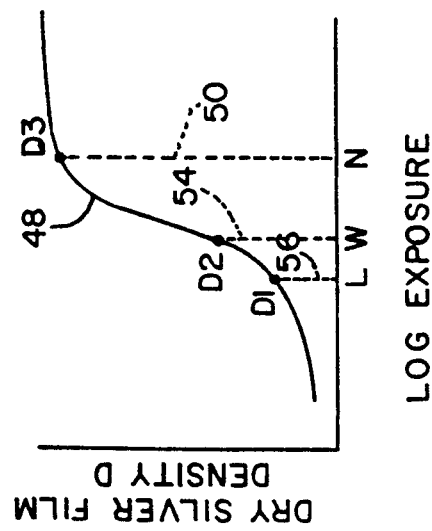

FILM WRITER AND VIEWER SYSTEM

BACKGROUND OF THE INVENTION

1. Field of the Invention

The present invention relates to a system for exposing, developing and viewing film, such as dry silver film, between a film supply reel and a film take-up reel.

2. Description of the Prior Art

It is often desirable, for example in aircraft reconnaissance, to be able to record information onto film and then quickly develop the film so that it may be viewed in a very short time after having been exposed. Systems for doing this have been devised in the past, but have heretofore utilized film which required wet baths for developing. Wet baths provide a number of difficulties, particularly in aircraft use where motions of the aircraft can easily cause spillage of the bath, and, accordingly, it has been sought to use a film which requires no wet baths. Dry silver film has the advantage of having no wet baths, but has heretofore had the difficulty that a very high intensity exposure is required, e.g. one hundred to three hundred times more intensity than that of the wet bath film. The recording device, such as a CRT writer, must therefore be driven at a level which undesirably shortens the life of the writer and reduces the resolution of the writer due to CRT beam spreading at high intensity levels. One method for reducing the required intensity for the writer is to utilize a lamp to pre-expose the film prior to its arrival at the writer, but this only solves part of the problem. The intensity required to write over the pre-exposed film is still too high to provide adequate life and resolution for the writer and heretofore there has been no practical system for utilizing dry silver film in an environment where it is desired to write, develop and view all within a short period of time.

SUMMARY OF THE INVENTION

The present invention utilizes, in addition to a pre-exposing lamp, a video camera to view a film which is somewhat less than adequately exposed by the writer, and providing its output to an image enhancer. The enhancer operates to increase the contrast between the information and the background so that it may be clearly seen on a TV monitor even though the film was underexposed, i.e. the number of useful gray scales are significantly increased. The end result is that the writer does not have to have an abnormally high intensity to expose the film so that its life is considerably extended. Also, its resolution is considerably improved because the CRT spot size is reduced by use of lower intensity levels.

BRIEF DESCRIPTION OF THE DRAWINGS

FIG. 1 is a block diagram of a system for pre-exposing, writing, developing and viewing a dry silver film according to the present invention;

FIG. 2 is a graph showing the effect pre-exposure has upon the density of the film and the reduced exposure made possible by use of video enhancement;

FIG. 3 is a graph showing the input/output voltage relationships of the video image electronic enhancer used in connection with viewing the dry silver film;

DETAILED DESCRIPTION OF THE PREFERRED EMBODIMENTS

Figure 5:
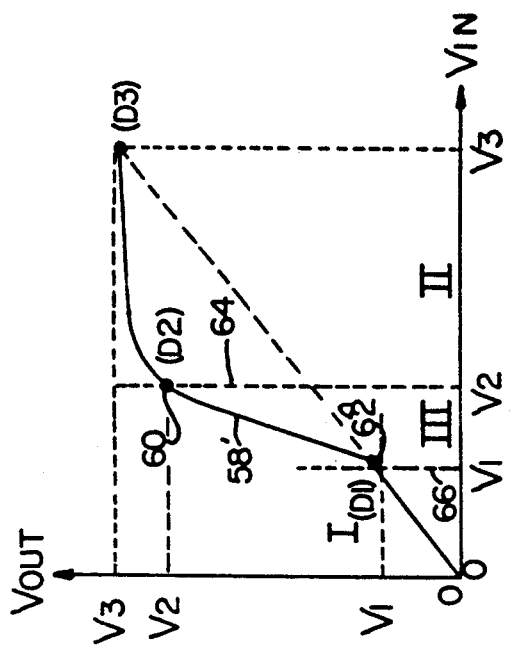
FIG. 5 is like FIG. 3 but for use with a positive film.

In FIG. 1, an infrared scanning device 10 is shown receiving radiometric information from a thermal scene being scanned along an input path shown as arrow 12. While an infrared scanner is shown, it is obvious that other sensors of information, such as radar, may be used. Scanner 10 operates to produce a signal suitable for recording by, for example, a CRT beam writer 14 over an output connection shown as arrow 16. In the preferred embodiment, output 16 is actually twelve separate lines, and CRT writer 14 is a twelve-beam writer so that information in twelve channels can be recorded simultaneously.

A film supply reel 20 is shown on the left-hand side of FIG. 1 being operable to contain a supply of dry silver film 22 which emerges therefrom and travels along a path by the system components to a film take-up reel 24 near the right side of FIG. 1. An energy source, such as heater 26 or lamp 26, is located adjacent the path of film 22 and operates to provide pre-exposure of film 22 to increase the density of the dry silver film to a predetermined value before writer 14 provides further exposure, as will be explained in connection with FIG. 2. Writer 14 is also mounted adjacent the path of film 22 just after it leaves lamp 26 and operates to impart the desired information onto film 22 as it passes. Because, even with the pre-exposing effects of lamp 26, writer 14 cannot expose film 22 with a sufficient intensity without unduly shortening its life, the film leaves writer 14 in only a partially developed state as will be more clearly understood in connection with FIG. 2.

A developing device such as a thermal developer 30 is mounted adjacent the path of film 22 shortly after it leaves the writer 14 and operates to develop film 22 so that it may be later viewed. Because the film was not fully exposed, the contrast between the information and the background on film 22 after development will be insufficient for normal viewing. Nevertheless, after leaving developer 30, film 22 passes over a light table 32 which operates to shine light up through film 22 towards a light sensing device such as a video camera 34 along light paths between arrows 36 and 38.

Video camera 34 views the imagery information on film 22 as illuminated by light table 32 and operates to produce an video camera signal along an output 39. The voltages of these video signals on output 39 are labeled $V_{IN}$ for purposes of explanation in FIG. 3 below. Since the film has been underdeveloped, the camera will see an image which is somewhat insufficient in contrast between the information on the film and the background. Accordingly, the $V_{IN}$ voltages representing information on film 22 will be less than desired and cannot be viewed immediately.

To improve the contrast between the information on film 22 and the background, an image enhancer 40 is connected to receive the signals on output 39 and operate in a manner which improves the contrast between these signals and the background. The image-enhancer circuitry is designed to amplify $V_{IN}$ signals in a specified non-linear manner, i.e. the information portion of the image containing $V_{IN}$ signals above a predetermined value are amplified much more than $V_{IN}$ signals below such value. An enhanced output signal $V_{OUT}$ is produced by the image enhancer 40 along an output line 42 to a TV monitor 44 for viewing by the observer and along an input/output line 45 to VCR 46 for recording and replay. The voltage of the signals on output lines 42 and 45 are labeled $V_{OUT}$ for purposes of explanation in FIG. 3 below.

By virtue of the combination of the pre-exposure of light source 26 and the image enhancer 40, the $V_{OUT}$ signals on line 42 representing information will be of sufficient magnitude with respect to the $V_{OUT}$ signals representing background to enable proper contrast, and TV monitor 44 will be able to produce the information on its screen in a manner which can be viewed easily by the viewer.

FIG. 2 shows the relations of pre-exposure by lamp 26 and primary exposure by CRT writer 14 on film 22. In FIG. 2, the vertical axis represents the dry silver film optical density: $D = -LOG(T)$ where T equals film transmission equal to or less than unity, and the horizontal axis represents the exposure of the film or, more particularly, the Log of the exposure of the film measured in units of energy, typically ergs. As dry silver film is exposed more and more, its density will increase along a line similar to line 48 in FIG. 2. To be completely exposed in a normal fashion, the density of the film should be at a value D3 which occurs at an exposure value of N, as shown by dashed line 50. However, as explained above, to provide an exposure N would require such a great intensity for writer 14 that its life would be too short. To improve the situation, lamp 26 is employed to produce a pre-exposure L which results in an increased density for film 22 to a value D1, as seen by dashed line 56. Now, instead of requiring that writer 14 expose the film from a point near the vertical axis to W, the operation of writer 14 need only be to expose the film from L to W, starting at the value D1. It is recognized that pre-exposing the film with lamp 22 will create a slight shift from a fully unexposed condition on the film, but this is insignificant due to placing D1 at the toe of curve 48 just before significant increases of density with exposure occur. At D1, the film still appears to be unexposed, i.e. clear, but slightly fogged.

Even with the addition of lamp 26, however, the exposure required for writer 14 to bring the density of film 22 from D1 to D3 would still be too great, and the life of the writer would still be shortened too much. Accordingly, writer 14 will operate to increase the exposure of film 22 only from D1 to a point D2 in FIG. 2 which occurs after an exposure W as seen by dashed line 54. The density D2 is chosen so as to preserve the life of writer 14 by decreasing the additional exposure it must provide and yet still be high enough such that an adequate contrast between the information and the background on film 22 will be provided by image enhancement.

As mentioned above, the underexposed film 22, containing information after development which is discernable but needs image enhancement, is viewed by camera 34 to produce the output voltage $V_{IN}$ to image enhancer 40. FIG. 3 shows the $V_{IN}$ voltages along a horizontal axis and the effects of the image enhancer as a $V_{OUT}$ signal along the vertical axis. Image enhancer 40 is designed to provide an input/output transfer function curve 58, for example. It is seen that curve 58 has three regions: I, from $V_{IN}=0$ to $V_3$, with unity gain; II, from $V_3$ to $V_2$, with low gain; and III, from $V_2$ to $V_1$, with high gain. Film density D1 produces $V_1$, D2 produces $V_2$, and D3 produces $V_3$, as shown in FIG. 3 by including the densities of FIG. 2 in parentheses at the corresponding voltages. The video camera output, $V_{IN}$ on line 39, is standard composite video in which active video black occurs at $V_3$ and white at $V_1$, with composite sync from 0 to $V_3$. Thus, it is seen that the incremental gains of curve 58 preserve the amplitudes of composite sync in Region I, reduce the amplitudes of signals in Region II which contains no useful information, and increases the amplitudes of signals in Region III which contains all the CRT writer image information between densities D1 and D2 which, as mentioned, produce camera output voltages $V_1$ and $V_2$.

Notice that $V_{IN}$ and $V_{OUT}$ have the same minimum voltage: 0, the same black level: $V_3$, and the same maximum voltage: $V_1$, i.e., the same white level. The only deviation of curve 58 from unity gain is between black level $V_3$ and white level $V_1$. In particular, curve 58 amplifies the signal voltages between $V_{IN}=V_2$ and $V_{IN}=V_1$ to the extent that $V_{OUT}$ varies from $V_1$ substantially to $V_3$ when $V_{IN}$ varies from $V_1$ to $V_2$. Thus, the high brightness, low contrast region from $V_1$ to $V_2$ is transformed into a high contrast video signal which spans substantially the entire active video region from maximum white $V_1$ to maximum black $V_3$.

The imager-enhancer circuitry clamps the video level to maintain the black level voltage $V_3$ due to density D3 using the well known video circuitry clamping techniques. Normal operation of video camera 34 regulates the video signal due to density difference from D1 to D3, which is the apparent black level, i.e. the point at which normal video transitions to video sync as shown in FIG. 3.

These relations ensure that subsequent standard video processing operations such as clamping, automatic gain control (AGC) and automatic level control (ALC) will not result in any loss of enhancement when the resultant $V_{OUT}$ signal on line 42 is displayed on video monitor 44 and/or recorded on video cassette recorder (VCR) 46, which commonly use such video processing operations.

These same standard video processing operations may also be used in image enhancer 40 for improved reliability of operation with non-standard video levels which frequently occur with improper video camera design, setup or signal transmission. The non-linear curve 58 of image enhancer 40 is easily provided with very well-known analog circuit design techniques such as diode shaping networks with operational amplifiers for precision wave shaping.

Figure 4:
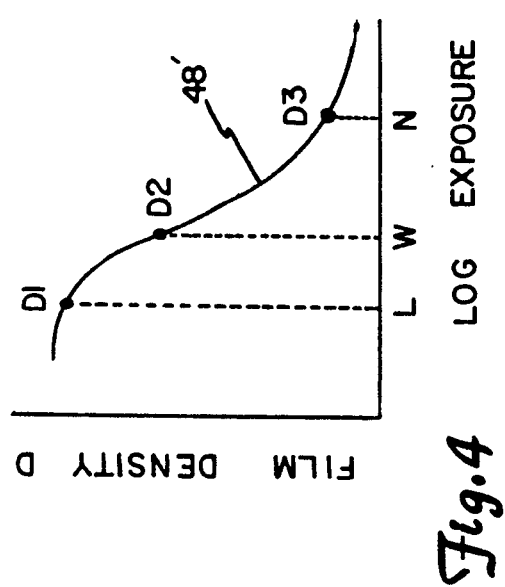
FIG. 4 is like FIG. 2 but for use with a positive film.

It will be apparent to those skilled in the art that the foregoing description applies to common negative reversal film in which a higher intensity exposure causes a darker gray scale after development. In the case of use of less common positive film, as in FIG. 4, curve 48 is reflected about a horizontal axis characteristically, and Regions II and III of curve 58 must be interchanged as in FIG. 5. The preceding comments, related to FIG. 3, apply equally to FIG. 5 due to the use of corresponding labels.

Figure 7:
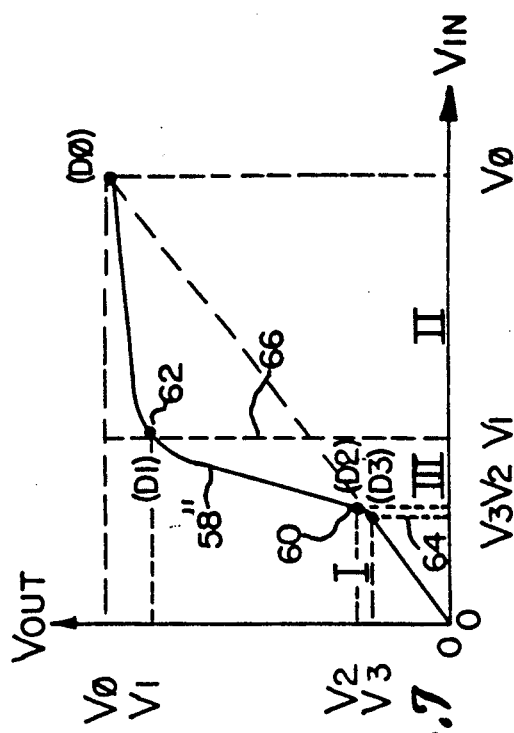
FIG. 7 is like FIG. 3 but with a much higher pre-exposure.
Figure 6:
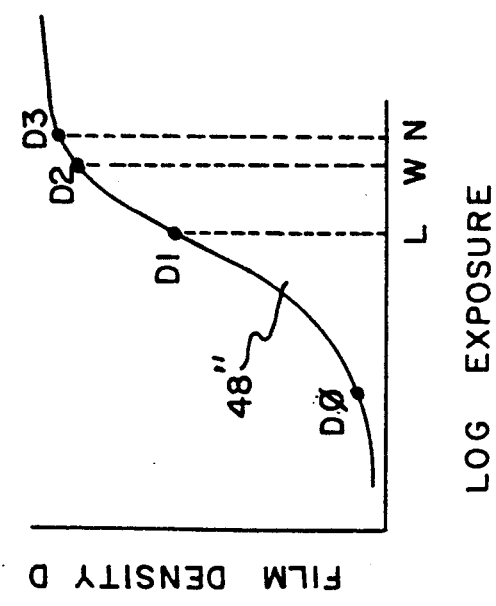
FIG. 6 is like FIG. 2 but with a much higher pre-exposure.

Alternatively, use of a much higher pre-exposure with common negative reversal film would cause D1 and D2 to shift to the locus of D3 on curve 48'' of FIG. 6, such that the information content between D1 and D2 would be darker on film and would result in video signals near $V_3$ on curve 58'' of FIG. 7, thus also requiring an interchange of Regions II and III, as in FIG. 5. In this case, the low density point $D\phi$ produces the maximum brightness $V\phi$. The nonlinear curve 58'' brings output $V_1$ due to $D_1$ close to $V\phi$, leaving room for expansion of signals between $V_1$ and $V_2$ to nearly the maximum allowable active video output. Again, the comments related to FIG. 3 apply to FIG. 7 due to the use of corresponding labels.

In summary, the effect of curves 58, 58' and 58" is to increase the contrast of CRT writer information for satisfactory viewing. In other words, if the $V_{IN}$ voltage corresponding to point 60 is identified as $V_2$ as seen by dashed line 64 in FIGS. 3, 5 and 7, and the $V_{IN}$ voltage corresponding to point 62 is represented by the voltage $V_1$ as seen by dashed line 66 in FIGS. 3, 5 and 7, $V_{IN}$ voltages not between $V_1$ and $V_2$ receive no enhancement while voltages between $V_1$ and $V_2$ receive a major enhancement. The net effect is that those $V_{IN}$ signal voltages representative of CRT writer information will be significantly increased while those $V_{IN}$ voltages representative of no information will be attenuated to provide room for useful information. Thus, an increased contrast will occur bringing out the desired CRT writer information with no loss of useful information.

This enhanced $V_{OUT}$ signal, as explained in connection with FIG. 1, maintains standard video characteristic values to allow normal viewing of the information by the TV monitor 44, and/or recording on VCR 46.

Thus it is seen that the present invention reduces CRT film writer exposure requirements first, by providing a desired pre-exposure bias with lamp 26 such that the subsequent small additional exposure with the CRT film writer 14 information occurs in a region of higher film sensitivity (higher gamma), and second, by then providing video image enhancement 40 in that region after development such that the CRT film writer information can be viewed with full contrast on video monitor 44 and recorded on VCR 46 for subsequent viewing.

Although the present invention has been described with reference to preferred embodiments, workers skilled in the art will recognize that changes may be made in form and detail without departing from the spirit and scope of the invention.

What is claimed is:

1. A film writer and viewer system comprising:
   energy producing means to expose energy sensitive film to a first predetermined density;
   writer means to expose said film to a second maximum predetermined density with information to be viewed;
   developer means to develop said film;
   transducer means mounted to receive energy indicative of the information from the film and to produce an output representative thereof; and
   enhancing means connected to the transducer means to receive said output and to increase the contrast of the information so as to produce an enhanced output with greater contrast of the information recorded on said film by said writer means.

2. Apparatus according to claim 1 further including film moving means to move said film past the energy producing means, the writer means, the developer means and the transducer means in sequential order.

3. Apparatus according to claim 1 further including display means to receive the enhanced output and to display the information.

4. Apparatus according to claim 3 further including a light source for directing light to said film and thence to the transducer means.

5. Apparatus according to claim 4 wherein the transducer means is a video camera which produces signals of a magnitude indicative of the intensity of light received from the light source via said film, the operating region of signals representing information being different than the operating region of other signals and the enhancing means increasing the voltage of the different operating region signals more than the other operating region signals to produce the enhanced output.

6. Apparatus according to claim 5 wherein the display means is a television monitor.

7. Apparatus according to claim 5 wherein the system includes an infrared radiation scanner to receive infrared information and produce a driving output connected to supply the information to the writer means.

8. Apparatus according to claim 1 wherein the writer means is a multiple beam CRT writer.

9. The apparatus according to claim 1 wherein said film consists of a dry silver type film.

10. The apparatus according to claim 1 wherein said film consists of a photographic film.

11. Apparatus including writer means and transducer means for use in recording information on energy sensitive film without over driving the writer means, comprising:
    lamp means for pre-exposing the film to a first density, the writer means thereafter further exposing the film with the information between the first density and a second density, the second density being less than normally required exposure density;
    developer means for developing the under exposed film to produce an image of the information with a less than desired contrast, the film thereafter being viewed by the transducer means to provide signals indicative of the image; and
    image enhancer means connected to receive the signals from the transducer means to increase the gain of those signals representing the information so as to increase the contrast.

12. Apparatus according to claim 11 further including film moving means to move the film sequentially past the lamp means, the writer means, the developer means and the transducer means.

13. Apparatus according to claim 11 further including television monitor means connected to the image enhancer means to produce an image of the increased contrast information.

14. Apparatus according to claim 13 further including input means operable to supply information to the writer means.

15. Apparatus according to claim 14 wherein the writer means is a CRT writer, the viewer means is a video camera and the display means is a TV monitor.

16. Apparatus according to claim 15 wherein the input means is an infrared scanner.

17. The apparatus according to claim 11 wherein said film consists of dry silver type film.

18. The apparatus according to claim 11 wherein said film consists of photographic film.

19. The method of decreasing the intensity requirements of a film writer operable to expose an energy sensitive film with information comprising the steps of:
    A. presenting the film to a pre-exposing lamp to expose the film to a first level;
    B. presenting the film to the writer to expose the film to a second level which is less than desired;
    C. developing the film to a less than desired contrast between the information and the background;
    D. viewing the developed film with a video camera to produce a series of output signals wherein signals representing information being viewed have a different operating region than other signals but have less magnitude than desired; and E. increasing the magnitude of the signals representing information in the different operating region more than the other signals to increase the contrast between the information signals and the other signals to compensate for the less than desired contrast.

20. The method of claim 19 further including the step of presenting the increased magnitude signals to a TV monitor for subsequent viewing.

21. The method of claim 20 further including the step of connecting an infrared scanner to the writer to supply the information thereto.

22. The method of claim 20 further including the step of projecting light through the developed film for viewing by the video camera.

23. The method of claim 20 further including film supply and take-up means and wherein said method removes undeveloped film from the film supply past the pre-exposing lamp, the writer, the thermal developer and the video camera in sequence and stores the developed film in the take-up means.

24. The method of claim 20 wherein said photographic film consists of dry silver type film.

25. The method of claim 20 wherein said photographic film consists of photographic film.

26. Image enhancing apparatus comprising:

a television camera viewing an image provided by photographic film wherein said film contains information placed thereon by a CRT writer and developed by a thermal developer, to be displayed with satisfactory contrast, the camera producing a signal $V_{in}$ representing background and information to be viewed but wherein the magnitude of those portions of the $V_{in}$ signal representing information being less than desired with respect to the magnitude of those portions of the $V_{in}$ representing background;

non-linear enhancer means connected to receive the $V_{in}$ from the camera and operable to amplify those portions of the $V_{in}$ signal representing information which are not within a predetermined region representing the background signal region by an amount greater than the enhancer means amplifies those portions of the $V_{in}$ signals which are within said predetermined region so as to produce an output signal $V_{out}$ in which the magnitude of those portions representing information is greater than the magnitude of those portions representing background by a desired amount; and receiving means connected to receive the output signal and operable to produce a viewable signal wherein the portions of the signal representing information are sufficiently greater than the portions of the signal representing background to provide satisfactory contrast in viewing.

27. Apparatus according to claim 26 wherein said film is pre-exposed by a pre-exposure lamp prior to having the information written thereon by said CRT writer.

28. Apparatus according to claim 27 wherein the receiving means comprises a video recording device.

29. Apparatus according to claim 27 wherein the receiving means comprises a TV monitor.

* * * * *